United States Patent [19]

Scharfenberg

[11] Patent Number: 4,866,229
[45] Date of Patent: Sep. 12, 1989

[54] APPARATUS FOR TRANSMITTING OPTICAL INFORMATION THROUGH A VIEWER'S HEADSET

[75] Inventor: Gottfried Scharfenberg, Siegertsbrunn, Fed. Rep. of Germany

[73] Assignee: Messerschmitt-Boelkow-Blohm GmbH, Munich, Fed. Rep. of Germany

[21] Appl. No.: 178,474

[22] Filed: Apr. 7, 1988

[30] Foreign Application Priority Data

Apr. 10, 1987 [DE] Fed. Rep. of Germany ....... 3712287

[51] Int. Cl.⁴ .............................................. G01J 1/20
[52] U.S. Cl. ................................ 250/203 R; 340/705; 350/174
[58] Field of Search ........... 250/561, 563, 216, 203 R; 340/705; 350/174; 358/93; 434/44

[56] References Cited

U.S. PATENT DOCUMENTS

| | | | |
|---|---|---|---|
| 3,205,303 | 9/1965 | Bradley | 358/210 |
| 4,048,653 | 9/1977 | Spooner | 340/705 |
| 4,153,913 | 5/1979 | Swift | 358/93 |

*Primary Examiner*—David C. Nelms
*Assistant Examiner*—Eric F. Chatmon
*Attorney, Agent, or Firm*—W. G. Fasse; D. H. Kane, Jr.

[57] ABSTRACT

Optical informations or data are transmitted by an essentially stationary transmitter and received by a mobile receiver attached to an operator's helmet or headset. A receiving lens and an optical wave guide lead to the operator's eye for the receiver. The optical transmitter is embodied as a projector arranged to be tiltable about its vertical axis and about a horizontal axis extending perpendicularly to the projected light beam direction. The projector further includes a tracking guide sensor and the receiver includes a reflector for establishing an optical guidance coupling between the projector and the receiver so that the projector may be appropriately pivoted to track the moving receiver.

10 Claims, 1 Drawing Sheet

APPARATUS FOR TRANSMITTING OPTICAL INFORMATION THROUGH A VIEWER'S HEADSET

FIELD OF THE INVENTION

The invention relates to an apparatus for transmitting optical information or data including an essentially stationary transmitter and a movable or mobile receiver which may be connected to a helmet or headset. The receiver includes an entry or receiving lens body and a beam path leading to the eye of an operator. Preferably, the beam path is enclosed.

DESCRIPTION OF THE PRIOR ART

For the operators of lead vehicles or command post control stations it is often necessary to observe invariable information or data such as, for example, a view of a map with a superimposed position indication, in addition to observing directly visible information, such as a view of the surroundings. Such a map view may be stored, for example, on a diapositive photographic film slide, whereby the information depicted on the slide must be delivered to the view of an operator.

U.S. Pat. No. 4,153,913 describes an apparatus for transmitting optical information, especially for the pilot of an aircraft. The known apparatus includes a stationary transmitter and a mobile receiver which is attached to a helmet. The receiver includes an entry or receiving lens body and a light conducting cable leading to the eye of a pilot. The optical waveguide or light conducting cable directs the transmitted optical information through an appropriate exit lens means onto a semireflecting mirror arranged at an angle so that the transmitted optical information or data is superimposed over a directly visible scene in the view of the pilot. An image of a cathode ray tube or of a crosshair reticle is received by the entry lens body or optical means of the receiver, which then directs the optical information through an optical fiber bundle onto the semireflecting mirror. In the known device precautions are taken to maintain the spacial constancy of the optical information to be transmitted to the pilot, because the optical information may, for example, be an image of a target. However, the known apparatus has the disadvantage of a relatively high weight. Besides, it limits the freedom of movement of the operator wearing the helmet.

OBJECTS OF THE INVENTION

In view of the foregoing it is the aim of the invention to achieve the following objects singly or in combination:

to improve an apparatus for transmitting optical data as described above so as to achieve a maximum freedom of movement for the operator using the apparatus;

to reduce the weight of such a receiver apparatus so that its use only slightly or insignificantly increases the characteristic weight of a helmet or headset;

to provide a simple and inexpensive structure for such an apparatus;

to construct such an apparatus so that the center of mass of a helmet to which the apparatus is attached remains located substantially at the center of the operator's head; and to achieve or improve on all the advantageous features of the prior known apparatus of this kind, namely the spacial location constancy of the transmitted data and the visual superimposing of transmitted data over a directly visible scene.

SUMMARY OF THE INVENTION

The above objects have been achieved in an apparatus for transmitting optical information according to the invention in which the transmitter is a projector which is tiltable about its vertical axis as well as about a horizontal axis extending perpendicularly to the light beam projection direction. The projector includes a follow-up or following guide sensor and the receiver is arranged for cooperation with a reflector for reflecting at least a portion of the transmitted beam of optical information back to the following or follow-up guide sensor, or alternatively the reflector of the receiver may reflect a separate guide beam emitted by the following or follow-up guide sensor back to the following guide sensor.

Advantageously, the projector includes an arrangement or device for generating symbols which may be superimposed over the actual optical information which is to be transmitted.

The guide reflector arranged for cooperation with the receiver may either be a prism reflector or a convex mirror.

The receiver is preferably provided only with a single exit lens means for projecting a monocular view of the virtual image of the information to be transmitted to one eye of the operator.

By means of the apparatus according to the invention, it becomes possible to project images of maps, for example, in the form of 50×50 mm² diapositive photographic slides with a superimposed position indicator. Due to the direct transmission of the projected image through an open collimated or parallel beam path in which the projection beam is guided to follow the helmet, active structural elements are not required on or in the helmet, or in other words, in the receiver. Hence, a separate power supply or other mechanical or electrical connections are also not required for the helmet. As a result, the weight of the helmet, together with the associated receiver can be held to a value below 800 g, whereby it is assured that the center of mass of the helmet and receiver combination remains located in the center of the head of the operator, whereby the freedom of movement of the head of the operator is enhanced.

Through the embodiment of the transmitter as a cardanically supported projector in which, according to the arrangement of the invention, symbols are generated, for example by means of LCDs, laser beams, or the like, which are superimposed over the map or other data of the photographic slide in an appropriate position relative thereto, the advantage is achieved that the complete positional or situational view exists in the collimated parallel beam path directed toward the receiver.

BRIEF DESCRIPTION OF THE DRAWINGS

In order that the invention may be clearly understood, it will now be described, by way of example, with reference to the accompanying drawings, wherein.

Figure 1:
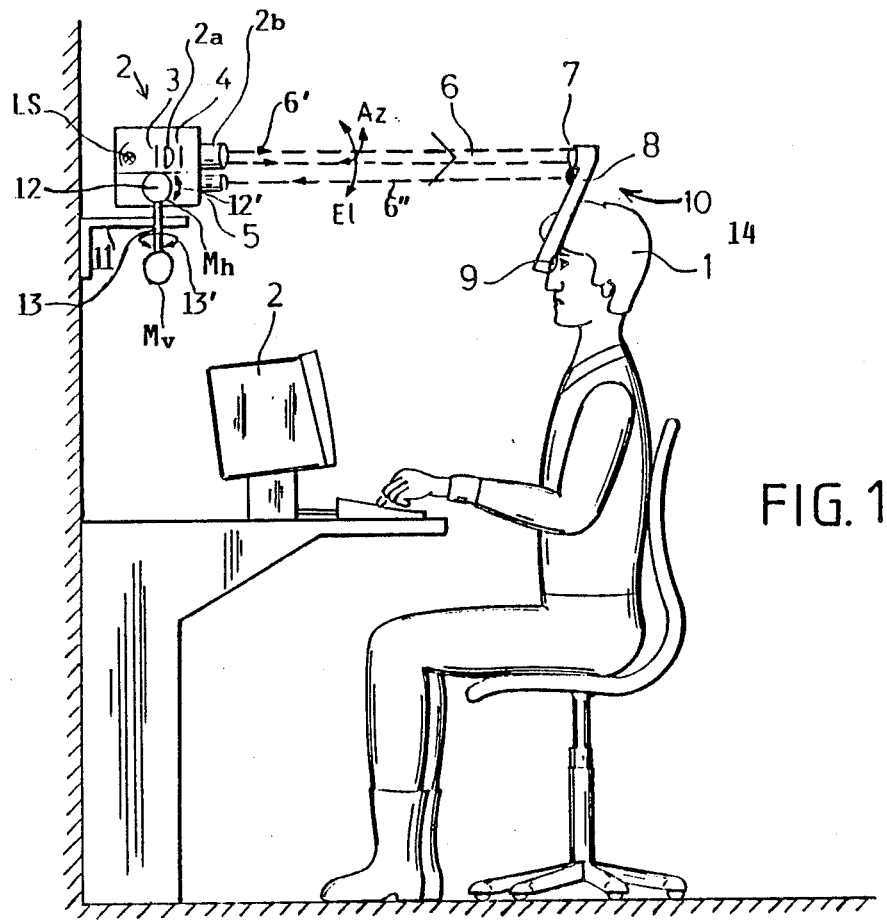
FIG. 1 is a schematic side view of an operator at a command post or control station using the apparatus for optical data transmission according to the invention.

DETAILED DESCRIPTION OF PREFERRED EXAMPLE EMBODIMENTS AND OF THE BEST MODE OF THE INVENTION

An operator who, for example, carries out guide or control duties in a vehicle or at a command post wears a helmet or headset 1. The operator may observe guide information or duties on a video screen 2' or alternatively, by directly viewing a visual scene.

An optical transmitter or projector 2 is provided for additionally transmitting optical information or data to the operator. The projector 2 is supported by journals on a console or a fixed support bracket 11 so that the projector 2 may carry out tilting or pivoting motions in the direction of the arrow 12' about a horizontal axis 12 as well as in the direction of the arrow 13' about a vertical axis 13. Thus the horizontal journal axis 12 extends perpendicularly to the direction of the projected light beam 6' which is emitted by the projector 2. A servomotor $M_h$ drives the projector 2 into a desired orientation about the horizontal journal axis 12 and a servomotor $M_v$ drives the projector 2 into a desired position about the vertical journal axis 13. The swivelling movement of the projector 2 about the horizontal axis 12 and the vertical axis 13 brings about a redirection of the elevation El and the azimuth Az respectively of the emitted light beam 6' as shown by corresponding arrows.

The projector 2 comprises an illuminating light source LS with an appropriately arranged reflector and any necessary cooling means. The projector 2 further comprises an appropriate holder for a photographic diapositive slide 3 which may, for example, depict a map image which may be projected through an appropriate exit or projecting lens body 2a and 2b to form an open collimated beam path 6 directed toward a receiver 10 arranged on the helmet or headset 1 of the operator. A follow-up or tracking guide sensor 5 is arranged near the projecting lens arrangement 2a, 2b of the projector 2, for example, below the projector lens arrangement 2a, 2b as shown in FIG. 1. The tracking guide sensor 5 receives and detects a reflected light beam 6'' which is reflected back from the receiver 10 as described below. The reflected light beam 6'' may be a reflected portion of the primary projected light beam 6' or may be a reflection of a separate guide light beam emitted by the tracking guide sensor 5. The tracking guide sensor 5 includes a goniometer or a four-quadrant detector for example, for detecting the reflected guide beam 6''. The signal of the detector of the tracking guide sensor 5 is used to control the servomotors $M_v$ and $M_h$ to appropriately pivot the projector 2 in the vertical and horizontal directions respectively so that the projected light beam 6' is always properly directed toward the optical receiver 10. That is to say, the projector 2 moves appropriately so that the light beam 6' follows or tracks the movable optical receiver 10 so that the beam path 6 always connects the transmitter or projector 2 and the receiver 10.

The optical receiver 10 is integrated in or attached to a headset or helmet 1 of an operator and comprises an entry or receiving lens 7, and a reflector 8 arranged appropriately adjacent the lens 7 for reflecting a secondary guide beam emitted by the guide sensor 5 or a portion of the projected beam 6' back to the guide sensor 5. The reflector 8 may be a prismatic reflector or a convex mirror. In order to prevent inadvertent stray reflections, the wall behind the reflector 8 is as nonreflecting as possible. An exit lens body or ocular 9 is arranged near the eye of the operator and an optical wave guide 14 optically connects the entry or receiving lens 7 and the ocular 9.

The projector 2 further comprises an optical symbol generator 4 for superimposing optical symbols over the image, for example, the map image, projected from the photographic slide 3. The optical symbol generator 4 may include LCDs, LEDs, laser beams, or the like for generating special optical symbols which are then superimposed into the beam path 6 with an appropriately aligned position relative to the image, such as the map image, of the photographic slide 3. Therefore, a complete positional image representation is formed in the open collimated beam path 6 in a direction toward the receiver 10, which in turn leads to a monocular representation of the virtual image for the operator because the exit lens or ocular 9 of the receiver is only arranged to be viewed by one eye of the operator. The optical symbol may, for example, be a pointer or the like.

In the example embodiment of an apparatus for transmitting optical information or data according to the invention as shown in FIG. 1, the projector 2 is arranged in front of, or in the general sight direction of the operator. The entry or receiving lens means 7 of the receiver 10 may be a convergent or condenser lens or some other collimating optic arrangement. The path of the collimated beam path 6, or rather, the position of the receiving lens 7 of the receiver 10 is arranged so that the operator is not blinded, in other words that the operator cannot directly see the glare, of the beam path 6 over the range of normal rapid head movements. Therefore, the receiver lens 7 is advantageously spaced approximately 20 to 30 cm above the eyes of the operator.

Figure 2:
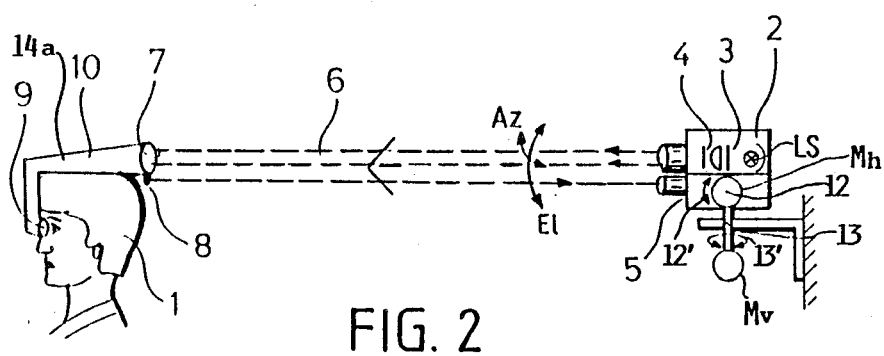
FIG. 2 is a partial view similar to that of FIG. 1, but of an alternative arrangement of the apparatus according to the invention.

The optical wave guide 14 of the receiver 10 which optically couples the receiving lens 7 and the ocular 9 may comprise angled mirrors, or alternatively redirecting prisms, or as a further embodiment a fiber optic cable 14a shown in FIG. 2, whereby the virtual image of the position representation is magnified true to scale to the ocular 9 to be viewed by the operator.

Because the receiving lens 7 of the receiver 10 attached to the helmet 1 is not guided or moved to follow the collimated parallel beam path 6, the operator must look in approximately the proper direction in order to be able to see the virtual image of the position information representation. This corresponds to a real image representation which, one would expect, is only visible from a certain range of view angles. If the operator moves his head in any direction out of the allowable range of view angles, the image will disappear. However, the projector 2 will continue to track or follow the receiver 10 by means of the reflector 8 and the guide sensor 5 so that the positional information image will again immediately become visible as soon as the operator turns his head to again face the appropriate direction.

In the example embodiment of the apparatus according to the invention as shown in FIG. 2, the projector 2 with its components as described above is arranged generally behind the operator. Therefore, the receiver lens 7 and the reflector 8 of the receiver 10, are arranged on the backside of the helmet 1. All the other elements are as described above with reference to FIG. 1. The embodiment of the receiver 10 as shown in FIG. 2 allows an even more advantageous dimension and weight distribution of the receiver 10 on the helmet 1 so as to maintain the center of mass of the helmet 1 and receiver 10 combination in the center of the head of the operator. As mentioned, the connection to the ocular 9 may be through a fiber optic cable 14a. Furthermore, the receiver lens 7 of the receiver 10 may be constructed on a larger scale and a considerably reduced interference may be achieved, for example, by avoiding the direct or ambient lighting of the work station. FIG. 2 further shows that the tracking guide sensor 5 includes a guide beam emitter 5a for emitting a guide beam toward the reflector 8 of the receiver 10.

In both embodiments described above, the receiver lens 7 and the reflector 8 are constructed and arranged so that an angular deviation of ±15° from the normal view direction on each axis is possible without the virtual image disappearing from the operator's view in the ocular 9.

Although the invention has been described with reference to specific example embodiments, it will be appreciated, that it is intended to cover all modifications and equivalents within the scope of the appended claims.

What I claim is:

1. An apparatus for transmitting optical information, comprising essentially stationary optical transmitter means and mobile optical receiver means, said transmitter means comprising optical projection means for projecting a tracking guide beam, vertical journal means for pivoting said projection means about a vertical axis, horizontal journal means for pivoting said projection means about a horizontal axis extending perpendicularly to a projection direction defined by said tracking guide beam projected by said optical projection means, and a tracking guide sensor comprising detector means for receiving said tracking guide beam, and wherein said optical receiver means comprise receiving lens means, optical connecting means interposed between said receiving lens means and an optical information detector of said optical receiver means, and a reflector for directing said tracking guide beam back to said tracking guide sensor.

2. The apparatus of claim 1, wherein said receiver means is incorporated in a headset or helmet for human operator, and wherein said optical information detector of said optical receiver means comprises at least one ocular for an eye of a human operator.

3. The apparatus of claim 2, wherein said optical connector means of said receiver means is a closed optical wave guide and wherein said ocular is arranged at an opposite end of said closed optical wave guide means from said receiving lens means, for forming a monocular virtual image of said transmitted optical information to be viewed by an eye of an operator.

4. The apparatus of claim 1, wherein said tracking guide sensor further comprises guide beam emitter means for emitting a guide beam toward said reflector of said optical receiver means.

5. The apparatus of claim 1, wherein said optical transmitter means further comprises optical symbol generating means for generating optical symbols which are superimposed on said optical information to be transmitted.

6. The apparatus of claim 1, wherein said reflector of said optical receiver means comprises a prismatic reflector.

7. The apparatus of claim 1, wherein said reflector of said optical receiver means comprises a convex mirror.

8. The apparatus of claim 3, wherein said closed optical wave guide of said optical receiver means comprises mirrors.

9. The apparatus of claim 1, wherein said optical connector means of said optical receiver means comprise optic fiber cable means (14a).

10. The apparatus of claim 1, further comprising a vertical drive servomotor for driving said pivoting about said vertical axis, and a horizontal drive servomotor for driving said pivoting about said horizontal axis, whereby said servomotors are controlled by a signal output of said tracking guide sensor of said transmitter means.

* * * * *